O. VOELKER.
PACKER AND CIRCULAR HARROW.
APPLICATION FILED NOV. 26, 1920.
1,414,842.
Patented May 2, 1922.
4 SHEETS—SHEET 3.
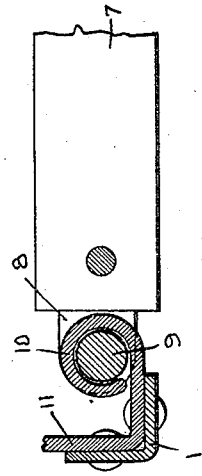
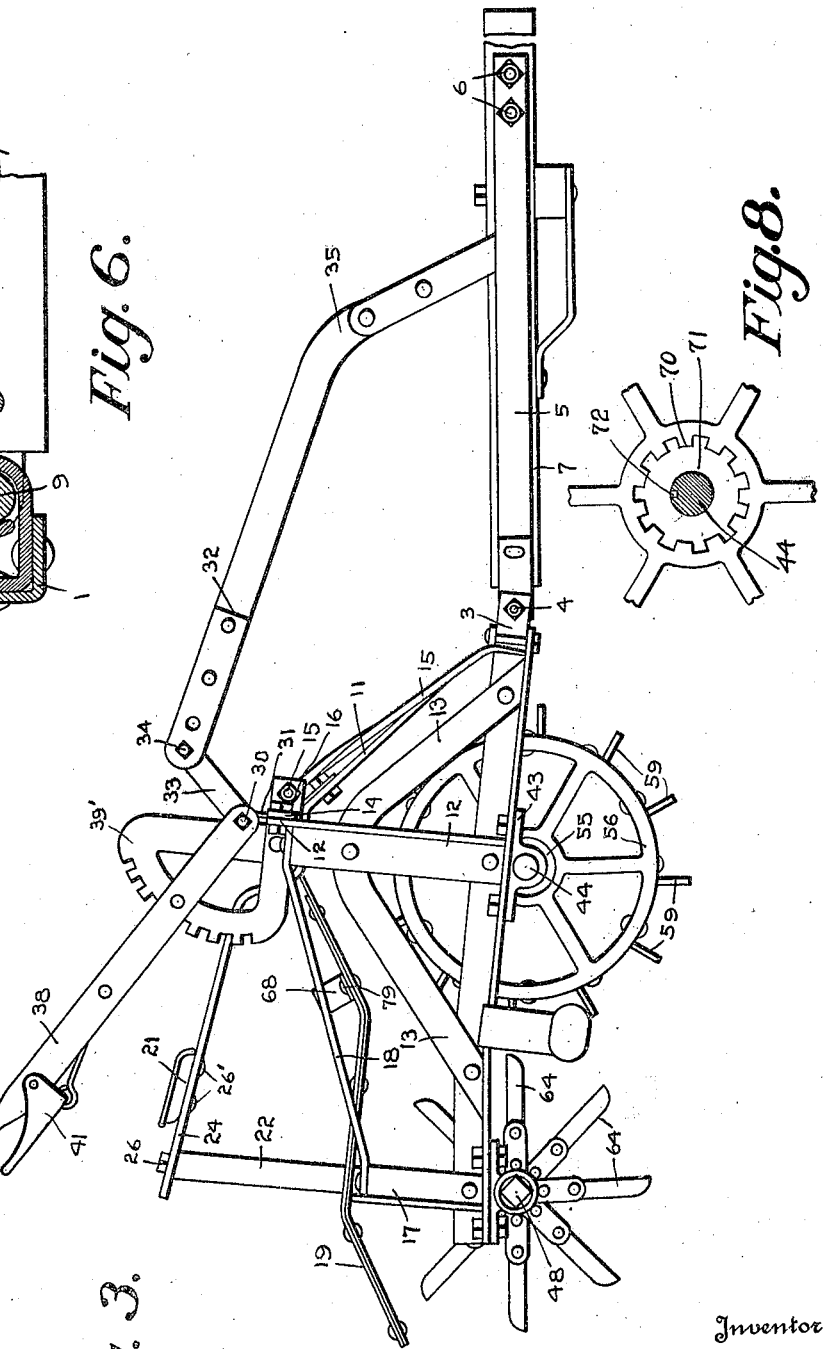
Inventor
OTTO VOELKER

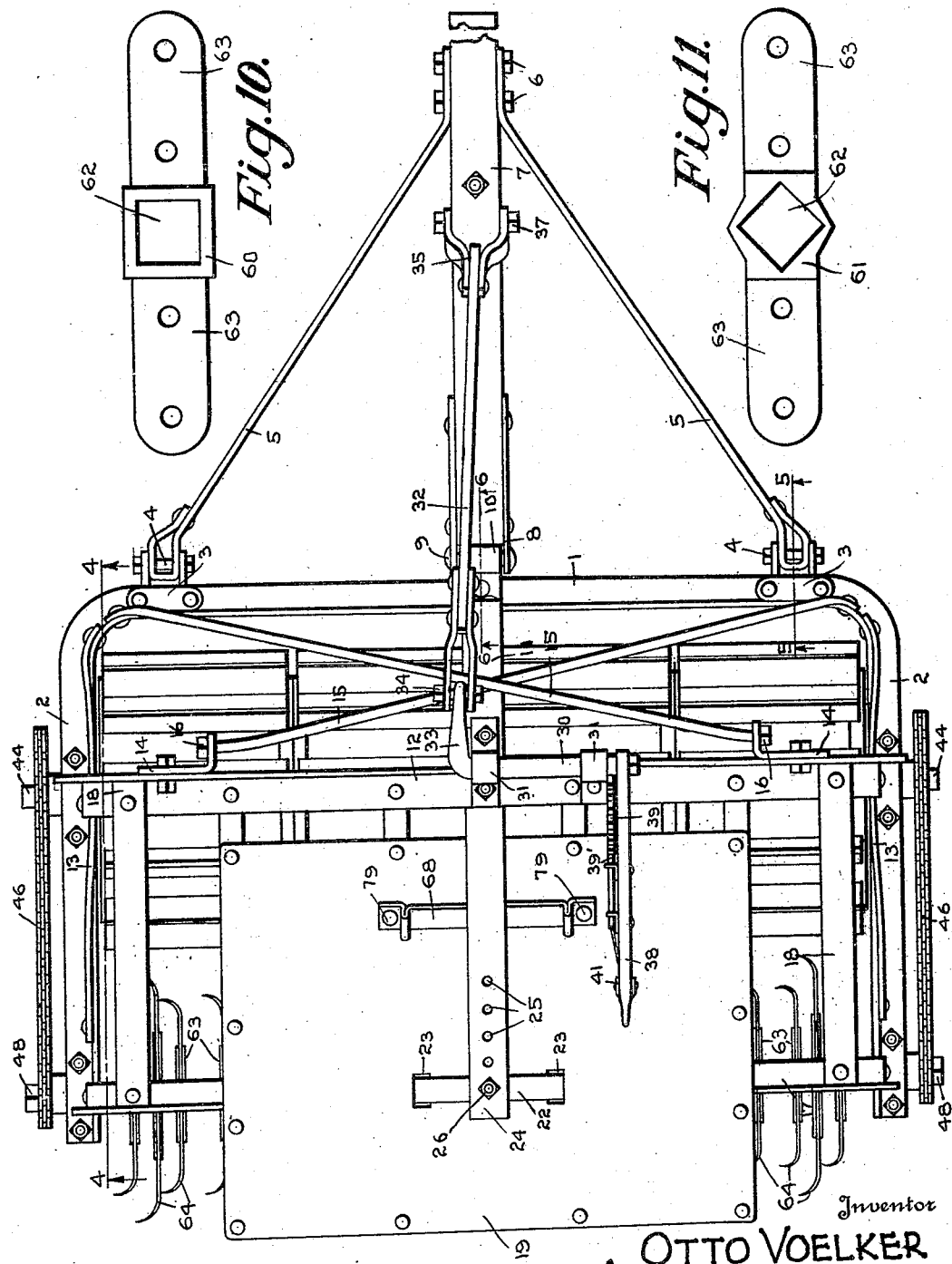

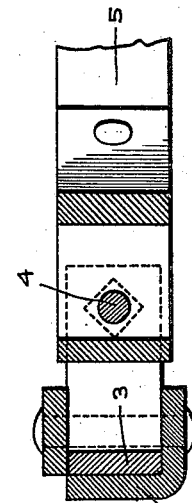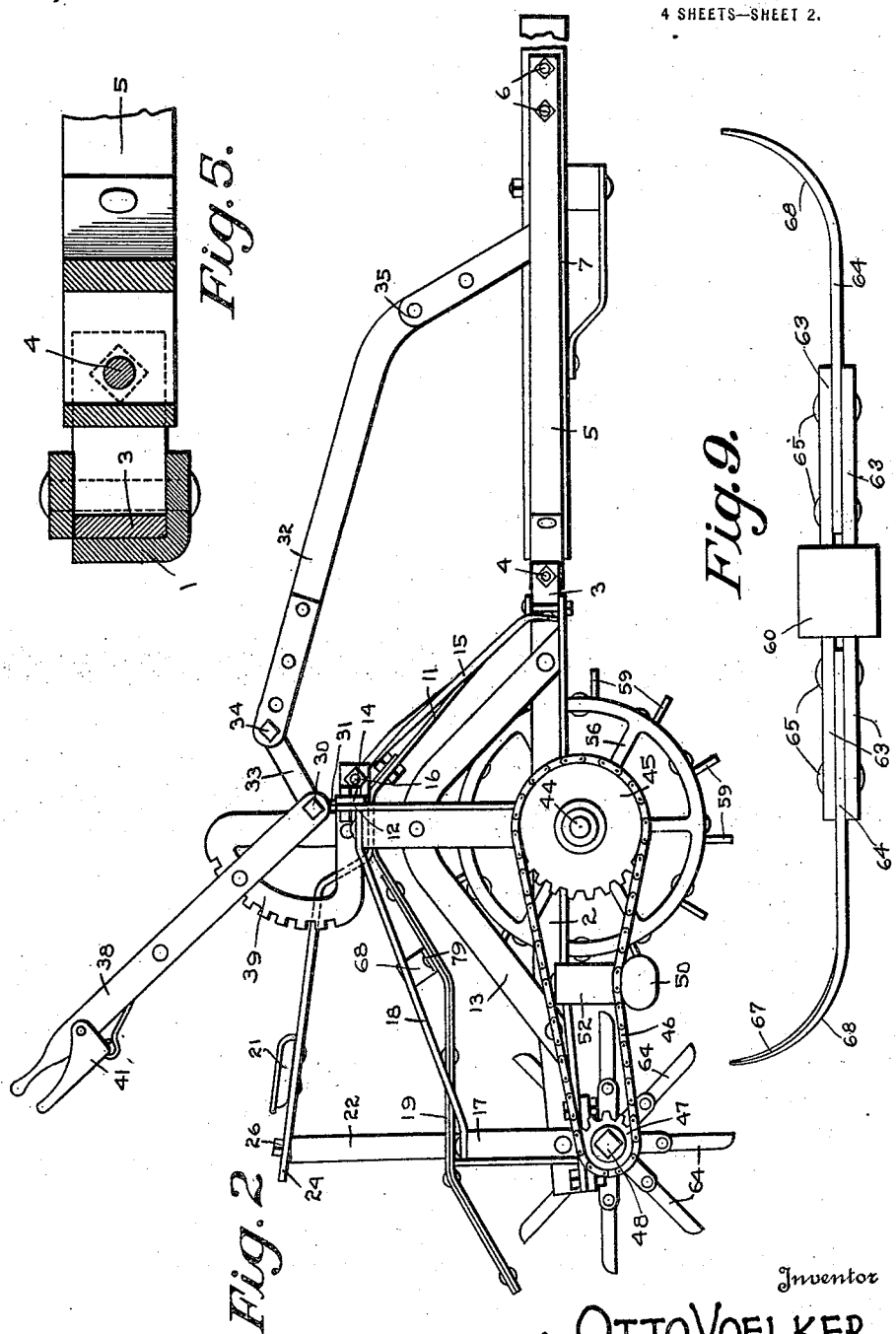

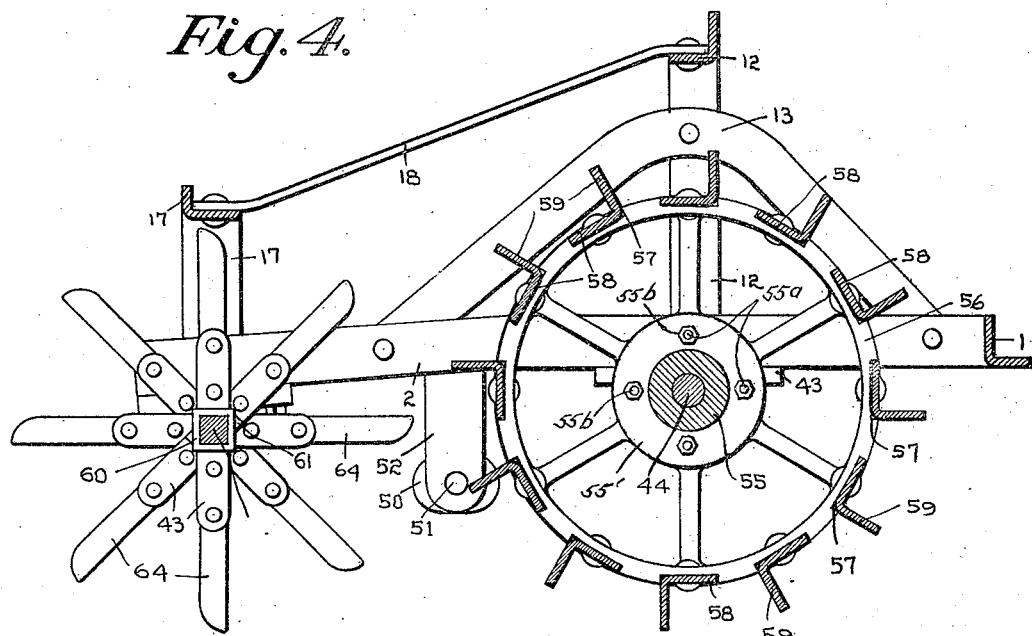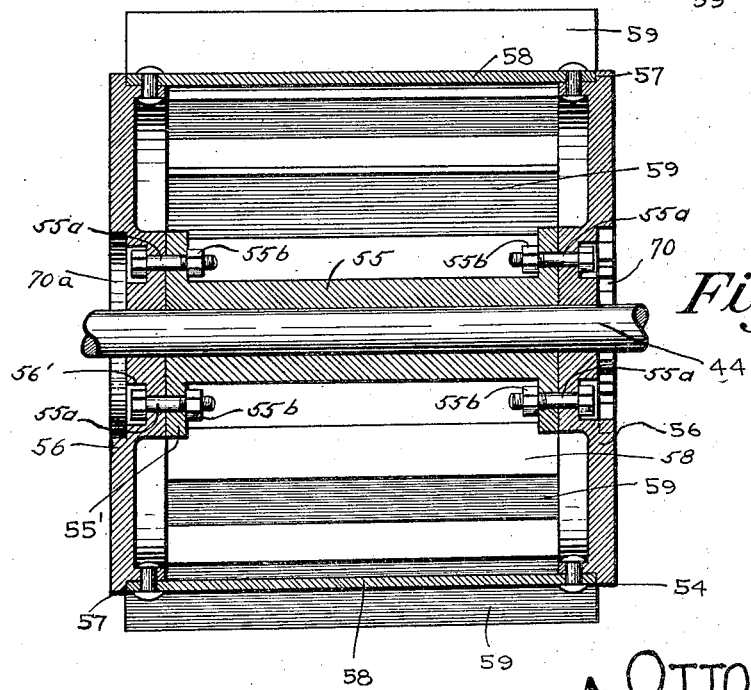

UNITED STATES PATENT OFFICE.

OTTO VOELKER, OF PALMER, KANSAS.

PACKER AND CIRCULAR HARROW.

1,414,842.    Specification of Letters Patent.    Patented May 2, 1922.

Application filed November 26, 1920. Serial No. 426,509.

*To all whom it may concern:*

Be it known that I, OTTO VOELKER, a citizen of the United States, residing at Palmer, in the county of Washington and State of Kansas, have invented certain new and useful Improvements in Packer and Circular Harrows; and I do hereby declare the following to be a full, clear, and exact description of the invention, such as will enable others skilled in the art to which it appertains to make and use the same.

This invention has relation to certain new and useful improvements in a packer and circular harrow and has for its primary object the provision of an agricultural implement of the character stated which will be constructed in such a manner that the ground or surface to be prepared will be packed and at the same time pulverized and the voluntary growth cut away without being gathered up in piles over the surface, thereby providing a smooth and flat surface ready for the sowing of seed or grain.

The invention has for another object the provision of an agricultural implement of the character stated which will be of improved and novel construction and operation and in which the cutting knives may be readily adjusted with respect to the surface by the operator without the necessity of leaving the operator's seat.

The invention has for a further object the provision of an agricultural implement of the character stated which will be considered and included an improved and novel form of roller and packer with the pulverizing blades carried thereby and improved cutting blades mounted extended transversely in the rear of the packer.

The invention has for a still further object the provision of a packer and harrow of the character stated in which both the shaft for the packer and the shaft for the harrow teeth may be mounted in a main frame to which the draft tongue is connected and upon an upstanding portion of which is mounted the adjusting lever and the cap therefor connected with the draft tongue for raising and lowering the harrow shaft and harrow teeth by varying the incline of the main frame from the front to the rear side thereof.

The invention has for a still further object the provision of an agricultural implement of the character stated in which the harrow shaft may be driven from the packer shaft during operation of the implement.

With the foregoing and other objects in view as will appear as the description proceeds, the invention consists in the novel construction, combination and arrangement of cooperating elements as hereinafter more specifically set forth, claimed and shown in the accompanying drawings forming a part of the present application and in which:—

Figure 1 is a plan view of the complete implement.

Figure 2 is a side elevation thereof.

Figure 3 is a side elevation, with sprocket wheels removed and rear end of implement in elevated position.

Figure 4 is a longitudinal section on the plane of line 4—4 of Figure 1.

Figure 5 is a detail section on the plane of line 5—5 of Figure 1.

Figure 6 is a detail section on the plane of line 6—6 of Figure 1.

Figure 7 is a detail longitudinal section of the packer roller and the blades carried thereby.

Figure 8 is a detail section through the forward shaft, showing one section of the packer roller in elevation thereon.

Figure 9 is an enlarged detail plan of one of the castings and hollow blades carried thereby.

Figures 10 and 11 are detail views of a pair of the harrow blade carrying castings.

Referring more in detail to the drawings in which similar reference characters designate corresponding parts throughout the several views, 1 designates the main frame which is preferably formed of angle iron and is of elongated form with the legs directed rearwardly to form the ends of the frame. The legs are considerably shorter than the main portion of the frame member forming the front side of the frame and carrying the front corner bracket members 3 which are preferably bifurcated, as shown in the drawings and have the bolts 4 extended therethrough, said bolts 4 being also extended through the looped rear ends of the tongue bracing straps 5 which converge toward their forward ends and are then bent in parallel relation and secured by means of the bolts 6 to opposite sides of the draft tongue 7. This draft tongue 7 has a bracket plate 8 projecting from its rear end to accommodate the pivot bolt 9 for the tongue 7, which pivot bolt 9 is also extended through the loop projecting end 10 of the iron 11 which is secured to the reinforced central portion 12 of the main frame front member and which extends upwardly and rearwardly, as clearly shown in the drawings.

The transverse upstanding frame member 12 has its depending short end portion secured upon the end member 2 of the main frame, adjacent the forward portions thereof, as shown in the drawings. This transverse upstanding frame member is also preferably formed of angle iron and is connected with the end member 2 of the main frame by suitable substantially V-shaped bracing members 13. The upstanding transverse frame member 12 is also provided with a pair of bracket members 14 on its forward face within which are engaged the threaded end portions of bracing rods 15 which are crossed by their lower ends to the forward corner portions of the main frame member 1. Suitable nuts 16 or the like are threaded upon the upper ends of the rods 15 to bear against the bracket members 14 and thereby tighten the rods 15.

A lower rear transverse frame member 17 of substantially U-shaped and composed of angle iron is also employed in building up this implement. The short depending ends of the rear transverse frame member 17 are secured to the end members 2 of the main frame 1 adjacent the rear extremities thereof. The transverse frame members 12 and 17 are connected by the connecting strap 18 near the opposite ends of the frame, thereby securely bracing the transverse rear frame member 17. A reversely guard plate 19 has the bracing and supporting strap secured to its under face and connected at their forward ends with the front transverse frame member 12. The purpose of the guard plates 19 will presently appear. In order to support the operative seats 21 upon the guard plates 19, I have provided a substantially inverted U-shaped member 22 which is mounted on the rear transverse frame member 17 and extended upwardly through a pair of openings 23 with the guard plates 19. The rear end of the strap member 11 is extended upwardly and then turned rearwardly, after passing under and being secured to the lower face of the forward transverse frame member 12. The rear portion of the member 11 is designated by the numeral 24 and has a plurality of openings 25 formed therein through one of which is extended a bolt 26 to secure the same to the bite portion of the supporting and bracing member 21. The seat 21 may be mounted on the rear end 24 of the strap 11 by means of bolts or the like 26′ extended therethrough and through one of the remaining openings 25.

A crank shaft 30 is mounted in suitable bearings 31 carried centrally on the upper face of the forward transverse frame member 12 and a connecting link 32 is pivotally mounted on the upstanding portion 33 of the crank shaft 30 by a suitable pivot pin 34. The opposite end of the connecting link 32 is curved downwardly and bifurcated, as shown at 35 and extended on opposite sides of the draft tongue 7 to receive the pivot bolt 37, thereby connecting the draft tongue 7 with the crank shaft 30. An adjusting lever 38 is mounted on the opposite squared end of the crank shaft 30 and carries a resiliently operated locking pawl 39′ adapted for engagement with the teeth of the rack segment 39 which is rigidly mounted on the transverse frame member 12. The locking pawl 39′ is adapted to be released by the usual form of releasing finger 41 pivoted to the lever 38 adjacent the upper free end thereof, as shown in the drawings, to permit the raising and lowering of the tongue 7 with respect to the main frame 1, the purpose of which will be clearly apparent.

Mounted beneath the main frame 1 in the bearing bracket 43 beneath the ends of the transverse upstanding frame member 12, is the packer shaft 44 which has sprocket wheels 45 rigidly mounted on its outer end portion and sprocket chains 46 engaged around said sprocket wheels 45. These sprocket chains 46 are also engaged around smaller sprocket wheels 47 mounted on the harrow shaft 48 which is rotatably engaged in bearing brackets 49 suspended from the ends 2 of the main frame 1 at points beneath the ends of the rear transverse frame member 17. In order to take up the slack in the sprocket chains 46, tension rollers 50 are mounted on stub shafts 51 carried in the depending bracket 52 mounted on the end members 2 of the main frame 1, the tension rollers 51 being engaged with the under face of the lower runs of the sprocket chains 46. It will be seen that the harrow shaft 48 is driven by the packer shaft 44 during operation of the implement.

The packer roller which is designated in general by the numeral 54 is formed in sections and each section comprises a hub member 55 carrying the wheels 56 at its opposite ends and which are provided in their peripheral portions with equally spaced recesses 57 to receive the base portions 58 of the packer blades 59, as shown in the drawings. The packer blades 59 are preferably formed of angle iron with the outturned portions thereof arranged in parallel relation with the packer shaft 44. The sections of the packer roller 54 are separately mounted on the packer shaft 44 and may be adjusted independently of one another to place their respective blades in different planes. Therefore, the packer blades 59 projecting radially from the respective sections of the roller may not be in alinement. It will be seen that the separate sections of the packer roller are provided with internal gear wheels 70, at their ends to be mounted upon driving gears 71 keyed to the shaft 45, as shown at 72. It will therefore be seen that the various sections of the packer roller may be turned a part of a revolution before being locked upon the gear wheels 71 so as to place the blades of the various sections in alinement, if desired, or in various positions with respect to one another. When the blades of the various sections of the packer roller are offset from one another, the corresponding blades of the different sections will be in different planes. These blades, however, will serve to pulverize the dirt as the roller passes over the same, thereby preventing the dirt from being packed hard as with a solid roller.

It will be understood that the hub 55 of each section of the packer roller has annular flanges 55′ at its opposite ends adapted to receive bolts 55ª extended therethrough and through the inwardly offset central portions of the ends of the wheel 56 forming the section of the packer roller, as shown clearly in Figure 7 of the drawings. The bolts 55ª may have suitable nuts 55ᵇ threaded on their inner ends and the heads of the bolt may be countersunk in suitable openings 56′ in the outer sides of the inwardly offset central portions of said ends 56 of the wheel or section without interference with the internal gear 70. Attention is also directed to Figure 4 of the drawings which shows the bolts 55ª and the nuts 55ᵇ mounted thereon.

The harrow shaft 48 is preferably square and has mounted thereon a plurality of castings 60 and 61 which are preferably placed in alternating position on the shaft. These castings 60 and 61 have squared openings 62 arranged so that the back head arms 63 of the castings 60 and 61 which arms are arranged in pairs extending in diametrically opposite directions, may project in a different direction. Each bifurcated arm 63 has a harrow blade or tube 64 secured in its bifurcated outer end by suitable securing members 65. The free end of each harrow blade or tube 64 is curved and tapered on one side with the tapered side beveled, as shown at 66, the beveled point being designated by the numeral 67. It will be noted that all of the harrow blades or teeth 64 are turned in the same direction, whereby the ground or growth of weeds may be properly destroyed by the harrow blades or teeth 64 during operation of the implement.

A suitable foot rest 68 in the form of a metallic bar is provided for the operator, the opposite end of the bar being bent upwardly and then turned downwardly again and outwardly and secured upon the guard plate 19, as shown at 69.

It will be readily seen that the guard plate 19 is of proper size to cover the greater portion of the tractor roller and the harrow mechanism and the ear edge of the guard plate 19 is curved downwardly over the rear transverse frame member 17.

From the foregoing description taken in connection with the accompanying drawings, it will be seen that this implement will be highly efficient in use and the harrow mechanism may be readily adjusted by operation of the lever 38 without the necessity of the operater leaving his seat. The operation of the lever 38 will serve to raise or lower the rear side of the frame together with the harrow mechanism as will be evident by referring to the drawings.

It is believed that the complete operation of the implement may be readily understood without further detailed description. It is also to be understood that while the preferred embodiment of the invention has been shown and described, minor changes in the details of construction and arrangement of parts may be resorted to within the scope of what is claimed without departing from the spirit of the invention.

What is claimed is:—

1. An agricultural implement comprising a main frame, a packer mechanism rotatably mounted in said main frame, an upstanding frame member mounted on said frame, a guard plate mounted on said upstanding frame member, a harrow mechanism mounted in said main frame rearwardly of said packer mechanism, a draft tongue connected with said main frame, and adjusting mechanism mounted on said main frame and connected with said draft tongue.

2. An agricultural implement comprising a main frame, upstanding frame members mounted on said main frame, connecting and bracing means for said upstanding frame members, a packer mechanism mounted in the forward portion of said main frame, a harrow mechanism mounted in the rear portion of said main frame, means for driving said harrow mechanism for said packer mechanism, a draft tongue for said implement connected with said main frame, and harrow adjusting means connected with said main frame and with said draft tongue.

3. An agricultural implement comprising a main frame, a draft tongue pivotally mounted on said main frame, bracing means for said tongue pivotally connected with said frame, a packer mechanism mounted for operation in said main frame, harrow mechanism rotatably mounted in said main frame, driving connections between packer mechanism and said harrow mechanism, upstanding frame members mounted on said main frame, a guard plate mounted on said upstanding frame members to cover portions of said packer mechanism and said harrow mechanism, an operator's seat mounted above said guard plates, draft mechanism connected with said main frame, harrow adjusting means mounted on said main frame and connected with said draft mechanism, and an operating lever for said harrow adjusting means adjacent said operator's seat.

4. An agricultural implement comprising a main frame, a draft tongue extended from said main frame, bracing means for said draft tongue, upstanding frame members mounted on said main frame, bracing means between said upstanding frame members and said main frame, bracing connections between said upstanding frame members, a pair of shafts extended transversely of the implement beneath said main frame, bearing means for said shaft, a packer mechanism on one of said shafts, harrow mechanism mounted on the remaining shaft, driving connections between said shafts, and adjusting mechanism mounted on said main frame and connected with said draft tongue.

5. An agricultural implement comprising a main frame, draft mechanism connected with said main frame, a pair of transverse shafts mounted for rotation beneath said main frame, auxiliary frame members mounted on said main frame, bracing connections between said upstanding frame members and said main frame, adjusting mechanism mounted on said main frame and connected with said draft mechanism, a sectional packer drum mounted on one of said shafts and including radially extended blades, a harrow mechanism mounted on the remaining shaft, and driving connections between said shafts.

6. An agricultural implement comprising a main frame, upstanding frame members mounted on said main frame, draft mechanism for said main frame, adjusting means for said main frame mounted on said upstanding frame members and connected with said draft mechanism, a forward shaft extended transversely beneath said frame, a packer means on said shaft, a second shaft mounted beneath said main frame within the first mentioned shaft, harrow means on said second mentioned shaft, and driving connections between said shafts.

7. An agricultural implement comprising a main frame, a draft mechanism extended from said main frame, upstanding frame members mounted on said main frame, adjusting means mounted on said upstanding frame members and pivotally connected with said draft mechanism, a forward shaft mounted transversely beneath said main frame, a packer roller mounted on said shaft, a second shaft mounted rearwardly of the first mentioned shaft and extended transversely beneath said main frame, harrow means on the second shaft and driving connections between said shafts.

In testimony whereof I affix my signature in presence of two witnesses.

OTTO VOELKER.

Witnesses:
W. H. RAVEN,
GEO. E. RAVEN.